US009283524B2

(12) United States Patent
Li et al.

(10) Patent No.: US 9,283,524 B2
(45) Date of Patent: Mar. 15, 2016

(54) WOVEN MEMBRANE MODULE WITH CONTROLLED TUBESHEET EPOXY WICKING

(71) Applicant: L'Air Liquide, Societe Anonyme pour l'Etude et Exploitation des Procedes Georges Claude, Paris (FR)

(72) Inventors: Tao Li, Garnet Valley, PA (US); Edgar S. Sanders, Jr., Newark, DE (US); Michael D. Bennett, New Castle, DE (US)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 14/136,505

(22) Filed: Dec. 20, 2013

(65) Prior Publication Data

US 2015/0174533 A1   Jun. 25, 2015

(51) Int. Cl.
*B01D 53/22* (2006.01)
*B01D 63/02* (2006.01)

(52) U.S. Cl.
CPC ............... *B01D 63/02* (2013.01); *B01D 53/22* (2013.01); *B01D 63/021* (2013.01); *B01D 63/022* (2013.01); *B01D 63/026* (2013.01); *B01D 2053/224* (2013.01)

(58) Field of Classification Search
CPC .... B01D 53/228; B01D 63/02; B01D 63/025; B01D 63/027; B01D 63/022; B01D 63/026; B01D 2053/224
USPC ........................................................... 95/45
See application file for complete search history.

(56) References Cited

U.S. PATENT DOCUMENTS

| | | | | | |
|---|---|---|---|---|---|
| 3,536,611 | A | * | 10/1970 | Filippi ................... | B01D 63/02 210/321.89 |
| 3,704,223 | A | * | 11/1972 | Hans-Joachim ....... | B01D 61/46 204/601 |
| 3,963,622 | A | * | 6/1976 | Baudet et al. ............ | 210/321.79 |
| 4,140,637 | A | * | 2/1979 | Walter ................. | B01D 63/021 210/321.79 |
| 4,172,794 | A | * | 10/1979 | Sigdell ................. | B01D 63/022 210/232 |
| 4,911,846 | A | * | 3/1990 | Akasu .................... | B01D 63/02 210/321.8 |
| 4,948,444 | A | * | 8/1990 | Schutz et al. ................. | 156/168 |
| 5,141,031 | A | | 8/1992 | Baurmeister | |
| 5,198,110 | A | * | 3/1993 | Hanai .................... | B01D 53/22 210/321.78 |
| 5,224,522 | A | * | 7/1993 | Baurmeister .......... | B01D 63/02 139/1 R |

(Continued)

OTHER PUBLICATIONS

International Search Report and Written Opinion for PCT/US2014/071458, mailed May 4, 2015, 9 pgs.

*Primary Examiner* — Jason M Greene
*Assistant Examiner* — Anthony Shumate
(74) *Attorney, Agent, or Firm* — Christopher J. Cronin

(57) ABSTRACT

A gas separation membrane module is formed from a woven fabric of weft membrane hollow fibers and warp yarns. The membrane module includes an active hollow fiber region spanning the inner edges of the two tubesheets. The membrane module also includes two tubesheets formed by encapsulating membrane fiber on one or both ends. The tubesheet on the end includes a first sub-region adjacent the active fiber and a second sub-region extending from first sub-region to the outer face of the tubesheet. The spacing of the warp threads is relatively denser in the first sub-region than in the active region or the second sub-region.

10 Claims, 1 Drawing Sheet

(56) References Cited

U.S. PATENT DOCUMENTS

| | | | |
|---|---|---|---|
| 5,230,862 A * | 7/1993 | Berry et al. .................... 422/48 |
| 5,284,584 A | 2/1994 | Huang et al. |
| 5,297,591 A * | 3/1994 | Baurmeister ............. 139/383 R |
| 5,598,874 A | 2/1997 | Alei et al. |
| 5,725,949 A * | 3/1998 | Pasquali ................. B01D 63/02 |
| | | | 428/222 |
| 6,294,039 B1 * | 9/2001 | Mahendran et al. .......... 156/242 |
| 6,616,841 B2 * | 9/2003 | Cho .................... B01D 19/0031 |
| | | | 210/321.74 |
| 6,663,745 B1 * | 12/2003 | Cheng .................. B01D 63/023 |
| | | | 156/293 |
| 7,122,121 B1 * | 10/2006 | Ji .............................. 210/321.67 |
| 7,169,295 B2 * | 1/2007 | Husain et al. ................. 210/150 |
| 2002/0195385 A1 * | 12/2002 | Cho .................... B01D 19/0031 |
| | | | 210/321.83 |
| 2011/0180474 A1 * | 7/2011 | Bowman ................. B01D 63/02 |
| | | | 210/615 |

* cited by examiner

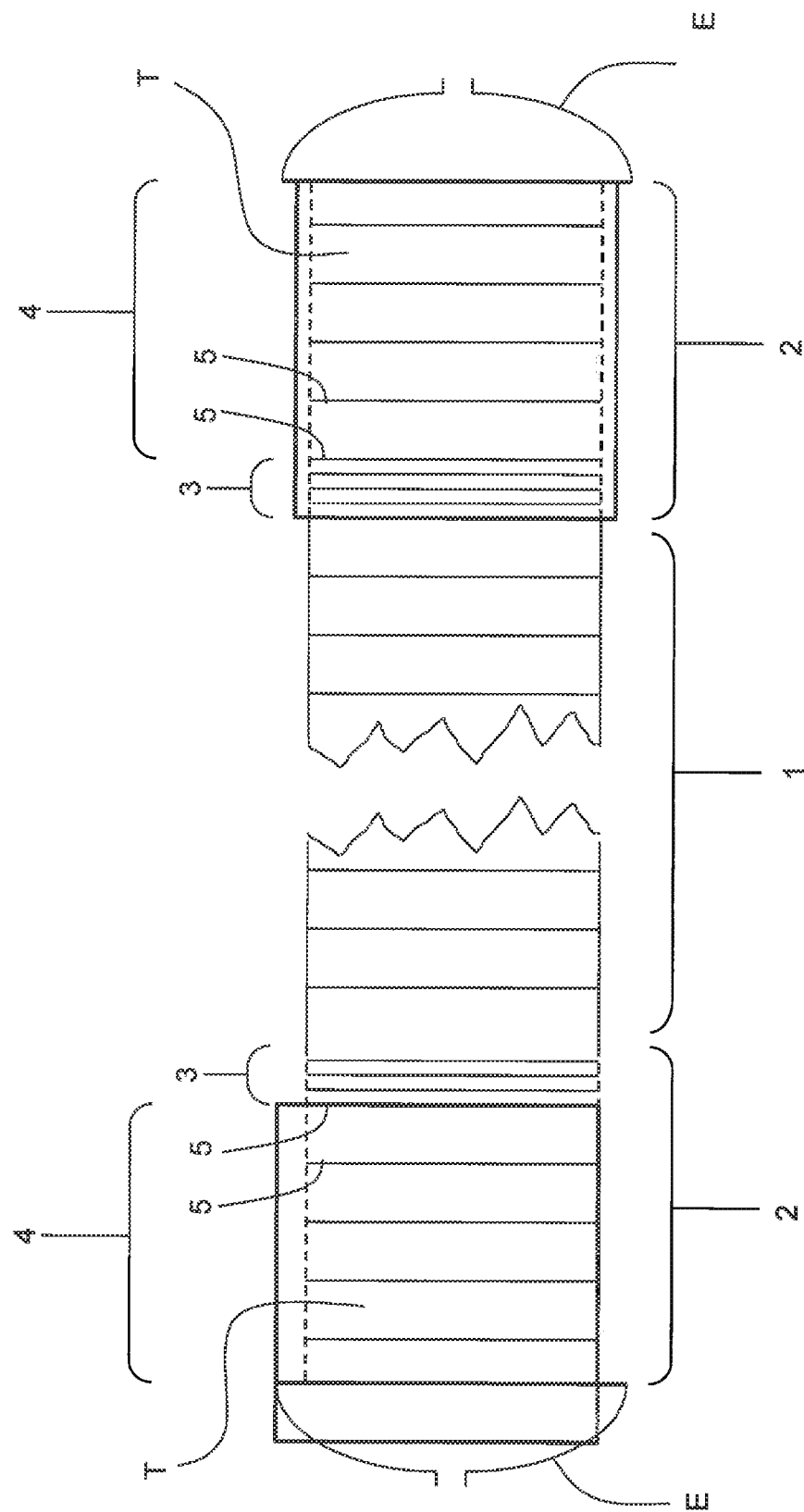

WOVEN MEMBRANE MODULE WITH CONTROLLED TUBESHEET EPOXY WICKING

CROSS-REFERENCE TO RELATED APPLICATIONS

None.

BACKGROUND

1. Field of the Invention

The present invention relates to woven membranes.

2. Related Art

Hollow fibers are converted into gas separation membrane modules in bundle forming wherein the hollow fibers are either placed parallel to a center core or wound around the core tube at an angle to the axis of the core tube. This type of membrane module manufacturing includes multiple steps performed by multiple machines that can be complicated, time-consuming and which present multiple opportunities for defects.

Some have instead proposed the formation of gas separation membrane modules by weaving the weft hollow fibers with warp threads on a loom followed by winding the woven fabric around a center core.

U.S. Pat. No. 5,598,874 disclosed such a woven gas separation membrane module. Two different warp threads were used: one in the central active region in between the two tubesheets and another in the selvage regions at both ends of the fabric. In particular, it proposed using a non-wettable or low-wettability synthetic thread (such as polytetrafluoroethylene or silicone rubber) in the selvage region in order to prevent wicking of the potting composition (that is later cured to form the tubesheet) up the bundle fibers and into the section of the fibers intended for the active region. However, such a use of a non-wettable or low-wettability thread is a double-edged sword. The same properties that prevent wicking of the potting composition will also result in a lower degree of coverage of the outer fiber surface by the potting material. In the finished tubesheet (after curing of the potting material), this lack of wetting leads to the presence of voids in between the outer surface of the hollow fiber partially wrapped with low-wettability warp threads and the adjacent tubesheet material. The voids in such a void-ridden tubesheet could act as stress concentrators in the tubesheet when the tubesheet is subjected to the high pressures typically experienced in gas separation processes. On the other hand, if a wettable thread was instead used, wicking of the potting material into the active region would no longer be prevented.

Thus, it is an object of the invention to provide a woven gas separation membrane module that does not experience the relatively weaker strength that would be expected in the void-ridden tubesheet resulting from the process proposed by U.S. Pat. No. 5,598,874. It is another object of the invention to provide a woven gas separation membrane module that avoids the problem of potting material wicking into the section of the fibers intended for the active region.

SUMMARY

There is disclosed a gas separation membrane module for separation of a gas mixture of interest, comprising:
first and second parallel, spaced tubesheets each of which has an outer end and an inner end;
a fabric wrapped core tube extending in a central region between the tubesheets in a weft direction, the fabric comprising weft fibers that comprise hollow fibers semi-permeable to a gas of interest and warp threads, the fabric including an active region extending between two tubesheet sections on opposite sides, tubesheet section comprising a first sub-region adjacent the active fiber and a second sub-region extending from first sub-region to the outer face of the tubesheet, the warp threads being spaced more densely in the first sub-region than the second sub-region;
first and second end caps secured to the outer ends of the first and second tubesheets, at least one of the end caps including an orifice for introduction or withdrawal of a gas; and
a pressure vessel extending between and secured to the first and second tubesheets, the pressure vessel surrounding the active region and including at least one orifice for introduction or withdrawal of a gas.

There is also disclosed another gas separation membrane module for separation of a gas mixture of interest, comprising:
a core tube having an axis;
a fabric spirally wrapped around the core tube, the fabric comprising weft hollow fibers that are semi-permeable to a gas mixture of interest and also warp threads, the weft hollow fibers extending in a direction parallel to the core axis, the warp threads spiraling in a direction perpendicular to the weft hollow fibers;
first and second tubesheets disposed at and impregnating opposite axial ends of the wrapped fabric, the tubesheets being comprised of thermoset or thermoplastic resin, a section of the fabric extending between the tubesheets being an active region, each section of the fabric impregnated by one of the tubesheets comprising a first sub-region adjacent the active region and a second sub-region extending from the associated first sub-region to the associated axial end of the fabric, the warp threads being spaced more densely in the first sub-regions than in the second sub-regions;
first and second end caps secured to the vessel to completely encase the outer ends of the first and second tubesheets, at least one of the end caps including an orifice for introduction or withdrawal of a gas; and
a pressure vessel encasing the first and second tubesheets, the pressure vessel surrounding at least the active region and including at least one orifice for introduction or withdrawal of a gas.

There is also disclosed a method of manufacturing the first above-disclosed gas separation membrane that comprises the following steps. The fabric is wrapped around the core tube. Liquid, resinous potting composition is injected into one of first and second ends of the fabric-wrapped core tube for a time sufficient to fill the potting composition along the weft fibers to the associated first sub-region. The potting composition is allowed to cure and form the tubesheet. Liquid, resinous potting composition is injected into the other of the first and second ends of the fabric-wrapped core tube for a time sufficient to fill the potting composition along the weft fibers to the associated first sub-region. The potting composition is allowed to cure and form the second tubesheet. The tubesheets are milled to open fibers and machined to fit pressure vessel and end caps. The membrane bundle with machined tubesheets is fit in to the pressure vessel. The end caps are secured to the vessel and tubesheets.

There is also disclosed another method of manufacturing the second above-described gas separation membrane module, comprising the steps of:
wrapping the fabric around the core tube;

injecting liquid, resinous potting composition comprising the thermoset or thermoplastic resin into one of first and second ends of the fabric-wrapped core for a time sufficient to impregnate the first and second sub-regions and fill in the potting composition among interstices of the weft fibers thereat;

allowing the liquid resin to cure and form the associated tubesheet;

injecting liquid, resinous potting composition into the other of the first and second ends of the fabric-wrapped core for a time sufficient to impregnate the first and second sub-regions and fill in the potting composition among the interstices of the weft fibers thereat;

allowing the liquid resin to cure and form the associated tubesheet;

machining one or both of the tubesheets to open one or both ends of the weft hollow fibers on the outer ends of the tubesheet;

securing the endcaps to the vessel to completely encase the tubesheets; and securing the pressure vessel to encase membrane bundle and tubesheets.

There is also disclosed a method of using the above-disclosed gas separation membrane module where each of the end caps includes an orifice for introduction or withdrawal of a gas. The method comprises the following steps. A gas mixture is introduced to the orifice of one of the end caps. A permeate is withdrawn from the orifice of the pressure vessel. A non-permeate is withdrawn from the orifice of the other of the end caps.

There is also disclosed another method of using the above-disclosed gas separation membrane module where the pressure vessel includes two orifices for introducing or withdrawing a gas. The method comprises the following steps. A gas mixture is introduced to one of the two orifices of the pressure vessel. A permeate is withdrawn from the orifice of one of the end caps. A non-permeate is withdrawn from the orifices of the center tube and exit through orifice of the other end caps.

Any of the modules, methods of manufacturing, and methods of using may include one or more of the following aspects:

there are first and second O-rings each one of which is disposed between a groove formed in an outer surface of an associated one of the tubesheets and an inner wall of the pressure vessel.

the active region and second sub-regions have a warp thread spacing of 0.1 cm to 5.0 cm and the first sub-regions have a warp thread spacing of 0.03 cm to 0.3 cm.

the thermoset or thermoplastic resin of the tubesheets is an epoxy resin.

the weft fibers are made of a polymeric material selected from the group consisting of polysulfones, polyether sulfones, polyimides, polyamides, polyaramides, polyamide-imides, and blends thereof.

the method further comprises the steps of machining a groove in an outer surface of each tubesheet and placing O-rings in the grooves to provide a gas tight seal between the tubesheets and the pressure vessels.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

The FIGURE is an elevation schematic view of the inventive gas separation membrane with portions removed.

DESCRIPTION OF PREFERRED EMBODIMENTS

This invention discloses a method to control epoxy wicking in injecting and potting tubesheet for gas separation bundles made from a woven web/fabric. Instead of using a non-wettable or low-wettability warp thread to inhibit epoxy wicking into the active region of the weft hollow fibers, the epoxy wicking is inhibited in practice of the invention by weaving the warp yarn at a higher density in a portion of each tubesheet that is adjacent to the active region. The active region is the section of the bundle this is not encapsulated with the epoxy of the tubesheet. Because the weft hollow fibers are not encapsulated in epoxy, they are still able to permeate gases across their walls. In contrast to the portions of the tubesheet having a higher warp yarn weaving density, the warp yarn is woven at a relatively lower density in the remaining sections of the bundle (i.e., the active region and the remaining portions of the tubesheets). Basically, the higher warp density in the section of the tubesheet adjacent the active region forms a physical barrier to epoxy wicking into the active region.

A single type of warp yarn is used. Thus, the warp yarn throughout the entire fabric width is the same. Any warp yarn may be used that is strong enough to withstand the typical level of tension to be encountered by a conventional loom, is non-reactive with respect to the weft fibers, and it is wettable with respect to the potting material. By using a wettable warp yarn, the potting material is allowed to fill in interstices among fibers in the tubesheet region. Additionally, the outer surfaces of the weft fibers are wetted and coated with the potting material so that substantially no voids are formed within the finished tubesheet after curing of the potting material to form a gas tight barrier of strong mechanical integrity. Accordingly, these yarns may be synthetic or made of natural materials. Examples are conventional nylon yarns. Nylon is not a low-wettability yarn with respect to the potting composition comprising epoxy. Indeed, the potting material wets the warp yarn very well and optionally may even react with it.

The weaving stage of the process of this invention can be any conventional machine-operated textile rapier loom capable of weaving a continuous fabric. A flexible rapier loom is one example. The warp yarns are fed from a beam into loom in fabric length direction. In contrast to the warp threads of U.S. Pat. No. 5,598,874, the same warp yarn is used in the invention across the entire width of the bundle from end to end.

The warp yarn can be fed to the loom by a conventional creel, spin beam, or any type of frame or feeding mechanism which will control the spacing and tension of the warp threads. The spacing of the warp yarn is not constant in all regions of the bundle (i.e., in each of the sub-regions of the tubesheet section, in selvage region and in the active region). Rather, the warp yarn spacing is relatively denser in a first sub-region of the tubesheet section that is adjacent to the active fiber, while the warp yarn spacing is relatively less dense in the second sub-region extending form the first sub-region to the end of the bundle. By using relatively less dense warp yarn spacing in the second sub-region, the potting material may more easily fill in the interstices among the weft fibers. The warp yarn spacing is also relatively less dense in the active region. By using relatively less dense warp yarn spacing in the active region, less stress is placed upon the weft fibers in the active region, thereby minimizing or reducing amount of weft fiber damage caused by formation of the fabric and bundle. It should be noted that the warp yarn spacing in the second sub-region and the active region needs not be the same so long as they are less dense than that of the first sub-region.

Thus, a dense layer of warp yarn is built up in a first sub-region of the tubesheet and a less dense layer of warp yarn is present in a second sub-region constituting the remaining section of the tubesheet. The dense layer forms a boundary between the active region (that extends between the tubesheets) and the second sub-region. The dense layer of warp yarn blocks the potting material from getting beyond the tubesheet into the active region.

Typical warp yarn spacings in the active region and the second sub-region will be from about 0.1 cm to about 5.0 cm, preferably from about 0.5 cm to about 2.5 cm. On the other hand, typical warp yarn spacings in the first sub-region will be from about 0.03 cm to about 0.3 cm, preferably from about 0.05 cm to about 0.1 cm. The fabric width is driven by the desired length of the weft fibers in the active region and the desired width of the tubesheets (i.e., the combination of the first and second sub-regions). Typically, the each tubesheet will range from about 1 cm to about 20 cm in width, or preferably from about 5 cm to about 15 cm in width. One example of a specific web width presently contemplated is 39 inches (99 cm) in total width, with the tubesheet about 3 inches (7.6 cm) each in width.

The weft membrane hollow fibers are also woven into the web/fabric, either singly or in tows. The number of fibers in each tow is not critical, and may vary depending on such considerations as strength and density. In most cases, the tow will contain at least 20 fibers, typically from 20 fibers to 150 fibers, more typically from 30 fibers to 120 fibers. The spacing of these tows could affect packing density of the fibers in the module. Ideally, the fiber tows should be close to touching each other in the fabric and bundle. The space between the tows should be at the minimum so that there is a maximum packing of the weft hollow fibers in the fabric and bundle. The fiber tows are not always uniform in diameter, so there might be some space between fiber tows along each weft tow in the fabric. A typical spacing will be from about 0 cm to about 0.5 cm between tows, preferably from about 0 cm to about 0.1 cm. The tow fibers are mechanically cut after they are pulled through fabric width on the loom, resulting in a web/fabric with the hollow fibers open at both ends. The web is then further cut with hot wires on both ends to seal open ends of the hollow fiber.

The fiber tows are preferably fed to the loom under a tension sufficient for proper loom operation, but not so great as to risk breakage of or damage to the hollow fibers. While the actual tension can vary, in most cases the tension will be less than 100 grams per tow, and best results will be obtained with tensions ranging from about 20 grams to about 60 grams. The selected tension is maintained by conventional loom braking systems, including friction brakes, electronic brakes or both. The brakes may be stationary and applied in a continuous manner, or dynamic and applied only upon release of the tow, or a combination of both.

The type of weave is not critical, but a simple square weave will suffice and will be the most convenient for the central portion of the web. For the selvage, it is often advantageous to utilize a denser or more locking type of weave to provide the edges of the web with added stability and strength. Leno weaving (which is an open weave in which pairs of warp yarns cross one another and thereby lock the filling fibers in position) is one type of weave useful for this purpose. The open ends of the hollow fiber can be further sealed by thermal or ultrasonic sealers after formation of fabric on the loom.

As is well known in the art, the tubesheets hold the fibers in place and separate the module into an inlet region where the incoming gas mixture is introduced into the fibers, a separation region where one or more components of the gas mixture permeate the fiber walls on a preferential basis, and an outlet region in which the non-permeate is collected for removal from the module. The tubesheets are generally formed from thermoset or thermoplastic resin, creating a fluid-tight seal around the fibers, and are applied to the fibers in such a manner that the fiber bores are left unfilled to allow entry or exit of the gas mixture. Tubesheets may also include resin-impregnated cloth.

Examples of resins useful for tubesheets are artificial and natural rubbers, epoxies, phenolaldehydes, acrylic resins, polysiloxanes, polyurethanes, and fluorocarbons. Epoxy resins are particularly preferred, prominent examples being glycidyl polyethers or polyhydric phenols. Polyhydric phenols suitable for use include both mononuclear phenols and polynuclear phenols, and included within the latter are the phenolaldehyde condensation resins commonly known as novolac resins. Examples of mononuclear phenols are resorcinol, catechol, hydroquinone, and phloroglucinol. Examples of polynuclear phenols are 2,2-bis(4-hydroxyphenyl)propane (bisphenol A), 4,4'-dihydroxybenzophenone, 1,1-bis(4-hydroxyphenyl)ethane, bis(2-hydroxynaphthyl)methane, 2,2-bis(4-hydroxyphenyl)butane, and 4,4'-(dihydroxyphenyl) phenylsulfone. Preferred epoxy resins are diglycidyl ethers of bisphenol A. The epoxy resin is cured with a conventional curing agent. Examples of curing agents include di- or polyfunctional amines such as aromatic diamines or mixtures or adducts thereof, and 2,4-dialkylimidazoles. Other useful amines are m-phenylenediamine, methylenediamine, mixtures and adducts of the two, diaminodiphenylsulfone, and 4-chlorophenylene diamine. A curing catalyst can also be included in the tubesheet composition. Typical curing catalysts for epoxy resins are tertiary amines such as benzyldimethylamine, N,N,N',N'-tetramethylbutanediamine, dimethylaminopropylamine, N-methylmorpholine, and N-triethylenediamine.

The tubesheet can be applied by a dunk potting method, in which the tubesheet section of the fully rolled web are dipped into the uncured liquid mixture. The unfinished tubesheet may be removed from the potting mold and cured. The unfinished tubesheet may also be cured in a mold having an attached heater band. Alternative means of applying the tubesheet mixture are by dripping the tubesheet at controlled rates over the tubesheet sections of the web as the web is being rolled. These methods are generally known in the art. The cured tubesheets are machined to open bore of the hollow fiber which was sealed by hot wire on the loom to prevent epoxy from filling it in potting. An O-ring groove may be optionally machined in the epoxy outer ring to provide a seal with the inside wall of the vessel. A shoulder may also optionally be machined in the tubesheet to provide mechanical support for the sleeve.

The final encasement of the rolled fiber web/fabric in a housing to form the module is accomplished by conventional methods as used for modules of the prior art. The casing is generally a pressure vessel in the form of a cylindrical tube sealed at both ends with end caps and containing appropriately placed orifices/ports for inlet of the feed gas and for outlets for both the permeate and the non-permeate. The casing protects the fiber membranes, channels the flows, and together with the tubesheet, defines the interior regions of the module. The tubesheets are sealed to the casing, using any conventional technique known in the art, including O-rings and grooves, or any other type of conventional fluid-tight sealing means. Depending upon the desired operating pressure, typical materials for the casing are plastics, plastic composites, aluminum, and steel. The casing is enclosed around the fibers by either using a two-piece clamshell-type casing or a single-piece casing in which the fibers are introduced at one end, followed by the securing of the end caps. Sealing of the casing is accomplished by welding, bolts, adhesives, or any other conventional means.

The present invention is useful in the manufacture of gas separation modules for the separation of a variety of gas mixtures.

The weft fibers are of course membrane hollow fibers. The art is replete with methods of manufacturing hollow fibers for gas separation membranes as well as examples of various polymers from which they may be produced. While selection of the particular membrane hollow fiber polymer is not critical to the invention, typical polymers include polysulfones, polyether sulfones, polyimides, polyamides, polyaramides, polyamide-imides, and blends thereof. The hollow fibers may be configured as monolithic fibers where they are made of a single material or as composite fibers where a substrate made of one material supports a sheath layer made of a different material comprising the separation layer.

As best illustrated in the FIGURE, a gas separation membrane module includes two end caps E, each of which is secured to a respective tubesheet T. The web/fabric comprises a plurality of the weft membrane hollow fibers (extending in the axial direction of the membrane module) and a plurality of the warp yarns 5 (extending perpendicular to the axial direction of the membrane module). Ends of the web/fabric in the tubesheet regions 2 are encapsulated by the epoxy of the tubesheet T. In addition to the tubesheet region 2, the web/fabric also includes an active region 1 where separation of the feed gas into a permeate and non-permeate occurs. It should be noted that a portion of the active region 1 has been removed in the FIGURE for purposes of clarity. Each tubesheet region 2 is divided into a first sub-region 3 adjacent active region and a second sub-region 4 extending from the first sub-region 3 to the outer face of the respective tubesheet T. As seen in the FIGURE, the warp yarn 5 spacing is denser in the first sub-region than in the second sub-region or the active region.

Experimental

Weft fibers useful in air separation membranes and warp nylon yarns were woven into a first (Comparative Example) and second (Example) fabrics. A warp density of 5.3 pairs/inch (corresponding to 10.6 warps per inch) was used in weaving across the entire width of the first fabric. For the second fabric, a warp density of 5.3 pairs/inch (corresponding to 10.6 warps per inch) was used in weaving the central, active region and each of the second sub-region of the two tubesheet sections. A higher warp density of 20 pairs/inch was used in each of the first sub-regions of the two tubesheet sections (adjacent the active region) of the second fabric where each first sub-region had a width of 0.75 inch. One of ordinary skill will of course recognize that the width of the second sub-region is the difference between the desired tubesheet length and the length of the first sub-region. The fabric was wound around a core tube to form a woven bundle.

Epoxy was injected into ends of each bundle as follows. An open ring was placed on top of the lower barrel in an epoxy injector. Epoxy was then poured into the barrel. Afterwards, the woven bundle was placed vertically on top of the open ring. The bundle was subsequently sealed circumferentially to the upper wall of the injector barrel with an inflated bladder. The bladder sealing prevented epoxy from leaking out from the circumferential side of the bundle during the injection. The piston of the injector was then activated to inject epoxy into the end of the bundle to form a tubesheet at a constant injection.

After epoxy injection, each bundle was potted in a mold. First, liquid epoxy was poured into the mold. The injected bundle was then transferred from the injector to the mold. The gap between bundle outside diameter in tubesheet section and inside diameter of the mold would be filled with liquid epoxy to form an epoxy ring around tubesheet. The liquid epoxy in the gap is also a reservoir for more epoxy to soak into the tubesheet of the bundle. The epoxy was cured in the mold to form a hard tubesheet.

After epoxy injection and potting of the bundle that included the first fabric, the epoxy wicked 3.5" up from the top of mold to the active fiber in the left tubesheet and wicked 2" in right tubesheet (FIG. 1). As a result, much of the fiber surface in the active region was coated with epoxy and rendered inactive to permeation of gases. In contrast, the epoxy only wicked 0.5" up from the top of the mold to the active fiber in the bundle that included the second fabric. Therefore, a much greater proportion of the fibers' surface remains uncoated with epoxy and remains effective for permeation of gases.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A gas separation membrane module for separation of a gas mixture, comprising:
   a core tube having an axis;
   a fabric spirally wrapped around the core tube, the fabric comprising weft hollow fibers that are semi-permeable to the gas mixture and also warp threads, the weft hollow fibers extending in a direction parallel to the core axis, the warp threads spiraling in a direction perpendicular to the weft hollow fibers;
   first and second tubesheets disposed at and impregnating opposite axial ends of the wrapped fabric, the tubesheets being comprised of thermoset or thermoplastic resin;
   an active region being a first section of the fabric extending between the first and second tubesheets;
   each second section of the fabric impregnated by one of the tubesheets comprising a first sub-region adjacent the active region and a second sub-region extending from the associated first sub-region to the associated axial end of the fabric, the warp threads being spaced more densely in each first sub-region than in each second sub-regions and the active region;
   first and second end caps secured to a pressure vessel to completely encase the outer ends of the first and second tubesheets, at least one of the end caps including at least one first orifice for introduction or withdrawal of a gas; the pressure vessel encasing the first and second tubesheets, surrounding at least the active region and including at least one second orifice for introduction or withdrawal of a gas.

2. The module of claim 1, further comprising first and second O-rings each of which is disposed in a groove formed in an outer surface of the first or second tubesheet adjacent the inner wall of the pressure vessel to provide a seal between the first or second tubesheet and the inner wall of the pressure vessel.

3. The module of claim 1, wherein the active region and second sub-regions have a warp thread spacing of 0.1 cm to 5.0 cm and the first sub-regions have a warp thread spacing of 0.03 cm to 0.3 cm.

4. The module of claim 1, wherein the thermoset or thermoplastic resin of the tubesheets is an epoxy resin.

5. The module of claim 1, wherein the weft fibers are made of a polymeric material selected from the group consisting of polysulfones, polyether sulfones, polyimides, polyamides, and blends thereof.

6. A method of manufacturing the gas separation membrane module of claim 1, comprising the steps of:
wrapping the fabric around the core tube;
injecting liquid, resinous potting composition comprising the thermoset or thermoplastic resin into a first end of the fabric-wrapped core for a time sufficient to impregnate the first and second sub-regions and fill in the potting composition among interstices of the weft fibers thereat;
allowing the liquid resin to cure and form an associated tubesheet;
injecting liquid, resinous potting composition into a second end of the fabric-wrapped core for a time sufficient to impregnate the first and second sub-regions and fill in the potting composition among the interstices of the weft fibers thereat;
allowing the liquid resin to cure and form the other associated tubesheet;
machining one or both outer ends of the tubesheets by removing the potting composition to open one or both ends of the weft hollow fibers on the outer ends of the tubesheet;
securing the endcaps to the pressure vessel to completely encase the tubesheets; and
securing the pressure vessel to encase the membrane bundle and tubesheets.

7. The method of claim 6, further comprising the steps of machining a groove in an outer surface of each tubesheet and placing O-rings in the grooves to provide a gas tight seal between the tubesheets and the pressure vessels.

8. A method of using the gas separation membrane module of claim 1 where each of the end caps includes an orifice for introduction or withdrawal of a gas, comprising the steps of:
introducing a gas mixture to the orifice of one of the end caps;
withdrawing a permeate from the orifice of the pressure vessel; and
withdrawing a non-permeate from the orifice of the other of the end caps.

9. A method of using the gas separation membrane module of claim 1 where the pressure vessel includes at least one second orifice for introducing or withdrawing a gas, comprising the steps of:
introducing a gas mixture to one of the at least one second orifice of the pressure vessel;
withdrawing a permeate from the first orifice of one of the end caps; and
withdrawing a non-permeate from the first orifice of the other end cap.

10. A method of using the gas separation membrane module of claim 6, wherein one ends of the weft hollow fibers are kept closed with the potting composition on the outer end of the first tubesheet and the other ends of the weft hollow fibers are machined by removing the potting composition to open on the outer end of the second tubesheet, each of the end caps includes at least one first orifice for introduction or withdrawal of a gas, comprising the steps of:
introducing a gas mixture to the second orifice of the pressure vessel;
withdrawing a permeate gas from the open ends of the weft hollow fibers to the first orifice of the end caps; and
withdrawing a non-permeate gas from the core tube to the closed ends of the weft hollow fibers and the first orifice of the other end cap, wherein the core tube is perforated.

* * * * *